April 17, 1951  H. C. HETTELSATER ET AL  2,549,088
REPLACEABLE TOOTH FOR ROTARY EARTH CUTTING MEANS Filed Sept. 7, 1946  2 Sheets-Sheet 1

Inventors
Henry C. Hettelsater
George L. Gavin
By
David A. Fox
Attorney

April 17, 1951  H. C. HETTELSATER ET AL  2,549,088
REPLACEABLE TOOTH FOR ROTARY EARTH CUTTING MEANS
Filed Sept. 7, 1946  2 Sheets-Sheet 2
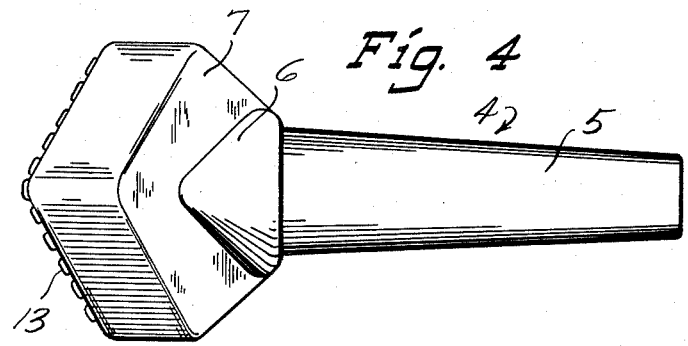
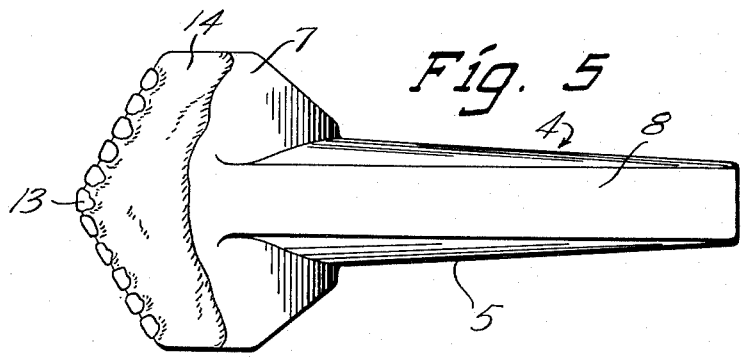
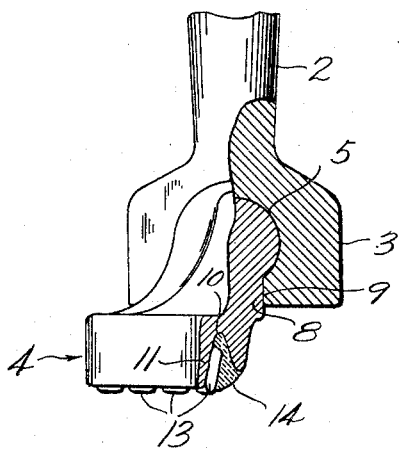
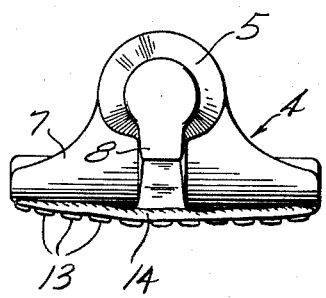

Patented Apr. 17, 1951

2,549,088

UNITED STATES PATENT OFFICE 2,549,088

REPLACEABLE TOOTH FOR ROTARY EARTH CUTTING MEANS

Henry C. Hettelsater, Whitefish Bay, and George L. Gavin, Milwaukee, Wis., assignors to Harnischfeger Corporation, Milwaukee, Wis., a corporation of Wisconsin Application September 7, 1946, Serial No. 695,376

4 Claims. (Cl. 37—189)

This invention relates to replaceable teeth for earth cutting means adapted for the comparatively rapid cutting rates employed in rotary earth cutting means, and resides more particularly in a tooth having a working end armed with embedded hard inserts, the cutting end being integrally joined with a tapered mounting shank adapted for replaceable mounting disposed in relation to the working end of the tooth so as to be self-seating.

One object of the invention is to provide an easily replaceable cutting tooth containing a minimum of material to be discarded when it is worn to the point when replacement is necessary while at the same time providing a tooth which is strong and capable of being securely held in place.

Another object of this invention is to provide a replaceable cutting tooth which is self-seating under load and inherently free of a tendency to twist in its mounting when under load.

Another object of this invention is to provide a replaceable tooth of such configuration as to be self-sharpening when in use and in which major wear will take place in parts of the tooth not depended upon for strength.

Another object of this invention is to provide a high speed earth cutting tooth armed with embedded inserts of extreme hardness capable of withstanding high-speed earth-cutting erosive wear under pressure protected from shattering impact by shock resisting material so disposed as to remain in place sufficiently to perform a shock shielding action during the life of said embedded inserts.

The above and other objects and advantages of this invention will appear from the description following in which there is set forth by way of illustration and not of limitation specific forms in which the tooth of this invention may be embodied, said description being given with the aid of the accompanying drawings forming a part hereof and in which—

Fig. 4 is a top plan view of the cutting tooth shown in Fig. 2;

Fig. 5 is a bottom plan view of the cutting tooth shown in Fig. 2;

Fig. 6 is a front view in elevation of the tooth shown in Fig. 2 parts being shown broken away and in section, the same being shown mounted in a fragment of a mounting arm of the cutting member shown in Fig. 1; and Fig. 7 is a rear view in elevation of the cutting tooth shown in Fig. 2.

Figure 1:
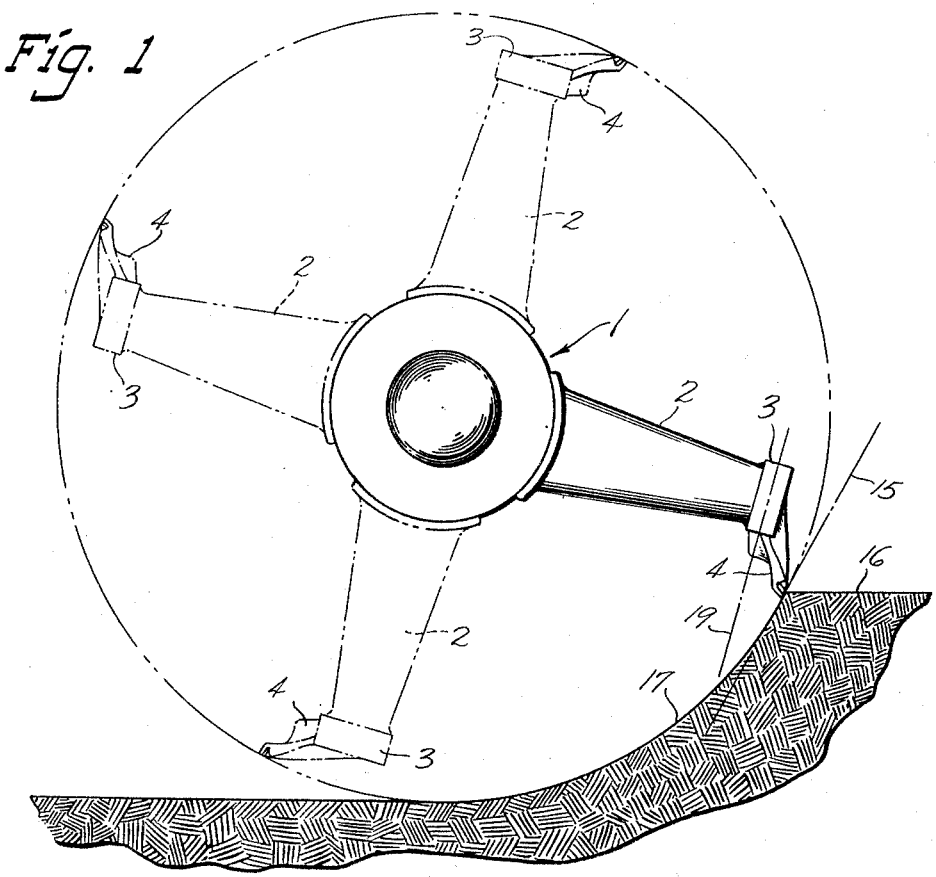
Fig. 1 is a side view in elevation and partly in outline of a rotary earth cutting member with one form of the tooth of this invention shown in place.
Figure 2:
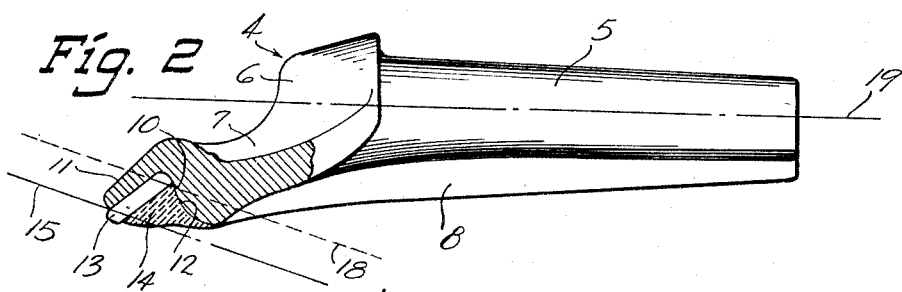
Fig. 2 is a side view in elevation with parts broken away and in section on a somewhat larger scale of one of the teeth shown in Fig. 1.

Set forth in Fig. 1 of the drawings is an end view of one form of earth cutting member 1 with which replaceable cutting teeth constructed in accordance with this invention may be employed. The cutting member 1 is provided with a plurality of arms 2 having open sided tangentially disposed tooth sockets 3 at their outer ends. The cutting member 1 may take on various forms other than that shown adapted to securely hold sockets such as the sockets 3 in position to receive cutting teeth.

Arranged to be received in the sockets 3 are teeth 4 one of which is shown in greater detail in Figs. 2, 4, 5, 6 and 7. As shown in the detailed views the tooth 4 is made up of an elongated tapering shank 5 integrally joined with a shovel portion at the forward end. The shovel portion of the tooth 4 is made up of a deflecting nose 6 of triangular configuration disposed opposite the shank 5 adapted to deflect material away from the sockets 3 in which the teeth are mounted and adapted to serve as an abutment upon which a hammer blow may be delivered for the purpose of seating the tooth in the socket 3.

The main part of the shovel portion of the tooth extends downwardly and laterally from the nose 6 to form a blade portion 7 and to form a plow shaped cutting edge which is well below the axis of the shank 5. Extending beneath the blade 7 from a point near its forward end rearwardly to the extreme rear end of the shank 5 is a stiffening rib or key 8 integrally formed with the other parts of the tooth. The key 8 thus serves to strengthen and reinforce both the shovel portion 7 and the shank 5. As shown more clearly in Fig. 6 the tooth socket 3 is provided with an open sided tapered opening shaped to conform closely with the exterior surface of the shank 5 and to receive the key 8 in abutting relationship with the side lips 9 of the tooth socket 3. With a tooth seated in a socket 3 it is rigidly held in place by reason of the taper of the shank 5 and is strongly restrained against tipping by engagement of the key 8 with the abutting lips 9 of the socket 3. When it is decided to remove a tooth it can be quickly driven out of place by a drift pin applied to the extreme back end of the shank 5. A worn tooth may thus be very quickly freed from the socket 3. A new tooth may also be very quickly inserted by sliding it into position and by hammering on the end of the nose portion 6.

The plow shaped cutting edge of the lower part of shovel portion 7 overlays an inverted V-shaped hard insert receiving trough 10 made up of a forward impact cushioning lip 11 and a rearwardly disposed shoulder 12. Disposed within the trough 10 are a plurality of hard inserts 13. The inserts 13 are disposed directly behind the impact cushioning lip 11 and are made up of such hard substances as cast or cindered tungsten carbide, cobalt carbide or boron carbide alloys or compositions, or other suitable hard metal or metal-like substances of hardness approximating that of the usual run of soil minerals. The substances suitable for hard inserts preferably are metallic or metal-like in character and are adapted to be whetted by fused alloys in the molten state. The inserts 13 are held in place by an embedding matrix 14 put in place by fusion welding so as to form a welded bond with the sides of the trough 10 and the external surface of the inserts 13. The material of the matrix 14 may be composed of steel alloys suitable for welding or of brazing alloys depending upon the composition of the inserts 13. If the insert 13 is of a material which will withstand the higher melting temperature of a steel alloy, it is preferable to employ the same for the matrix 14. If, on the other hand, the insert 13 may be harmed by such temperatures the matrix 14 may be made up of alloys melting at lower temperatures such as brazing alloys.

The material of the tooth 4 preferably is selected from among the tough, resilient steel alloys in order to furnish sufficient strength for the parts and to impart to the protecting lip 11 ability to withstand impact without shattering. The protecting lip 11 furthermore is disposed with respect to the line of cutting action indicated at 15 so as to have a large, positive rake with respect thereto. By reason of this large, positive rake the pressure of material being cut which is imposed upon the lip 11 is substantially reduced, and although the lip 11 is not composed of a material capable of withstanding erosion under heavy pressure, it nevertheless withstands such wear as is imposed upon it over a protracted period. It will be understood that a rotary cutting member such as member 1 is intended to be advanced into an earth layer such as shown at 16 in Fig. 1 with a steady, forward feed rate. By reason of this action the rapidly rotating cutting member 1 brings the lower ends of the inserts 13 into contact with the cut face 17 of the earth 16 under very considerable pressure. The inserts 13 are well adapted to withstand the erosion occurring under such heavy pressure, although by reason of their hardness they are subject to being shattered by direct impact. If any uncut hard obstruction projects from the cutting face 17, the impact upon encountering the same is absorbed by the impact withstanding lip 11. Under use the inserts 13 become slowly eroded by wear and such wear continually reduces the under side of the forward end of the tooth 4 by removal of material in planes parallel to the line of cutting action indicated at 15. By reason of this a self-sharpening action occurs and the tooth remains sharp and effective until the inserts 13 are substantially used up as indicated by the ultimate wear line indicated by the dotted line 18 in Fig. 2. As may be observed in Figs. 2 and 3 the actual cutting edge of the tool is the extreme forward limit of the lip 11 or 11'. Under conditions of actual wear the lip 11 or 11' being of substantial thickness presents to the surface undergoing cutting, a flank of substantial width, extending from the extreme forward edge to the lip 11 or 11' to the trough 10 or 10'. The fused matrix 14 or 14' together with the insert material 13 or 13' provides a secondary flank portion extending rearwardly from the flank portion provided by the lower part of the lip 11 or 11'.

The forward end of the shovel portion 7 is preferably formed as indicated in Fig. 4 in a pointed or plow shaped form as indicated clearly in Figs. 4 and 5. By reason of this configuration and by reason of the disposition of the shovel portion 7 entirely below the axis of the shank 5 loads imposed upon the tooth 4 tend to maintain the tooth in working position very materially reducing the amount of twisting force applied thereto in the socket 3. As a result the key 8 is adequate to withstand such twisting forces as may be applied to the tooth and the sockets 3 are relieved of the spreading action that would be imposed thereon if heavy twisting forces were encountered. This self-seating, stabilizing action of the tooth 4 arises out of the disposition of the cutting edge of the tooth with respect to the axis 19 of the shank 5. As may be noted clearly in Fig. 1 the axis of the mounting shank 5 intersects the working face 17 at a point well in advance of the working contact point of the tooth 4.

Figure 3:
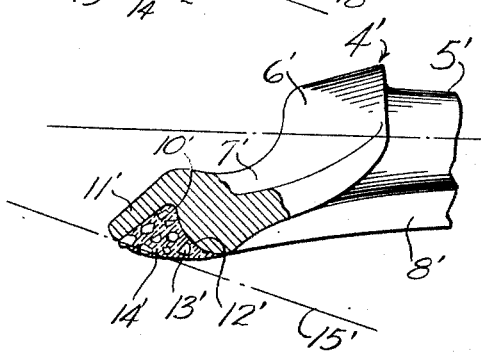
Fig. 3 is a fragmentary side view in elevation with parts broken away and in section of a tooth differing from the tooth shown in Fig. 2 in respect to the type of hard insert employed.

If desired, the tooth of this invention may be constructed in a modified form as indicated in the fragmentary view in Fig. 3. In Fig. 3 a tooth 4' is shown having a configuration closely conforming to that of tooth 4. Similar parts of the tooth 4' have been given numbers corresponding with parts of the tooth 4 and description of the same will not be repeated. It is sufficient to note that the numbers applied to parts in Fig. 3 have been given the added notation of the prime mark. The trough 10' of the tooth 4', however, instead of accommodating discreet insert bodies 13, as in the case of tooth 4, is filled completely with a mixture of matrix material and small, irregular fragments of hard insert material. These irregular fragments are designated 13' in the case of tooth 4' while the matrix material holding the same in place is designated 14'. Resistance to eroding wear under pressure in a direction perpendicular to the line of action 15' is increased in the case of the tooth 4' by the hard insert material 13' and the action of this form of the tooth of this invention is quite comparable with that of the tooth 4.

While the cutting face of the shovel portion 7 preferably is plow shaped as shown, the tooth of this invention also may be effectively employed where the shovel portion 7 has a straight cutting face or face of other particular configuration.

We claim:

1. In a replaceable tooth for rotary earth cutting means, an elongated attachment shank of slightly tapering frustro-conical form, a stiffening rib starting at the smaller rear end of said shank and extending forwardly along and projecting from the lower side of said shank, an obliquely disposed transverse shovel portion extending forwardly and downwardly from the larger forward end of said shank spreading laterally therefrom on both sides thereof, said stiffening rib also extending forwardly from the forward end of said shank beneath and merged with the lower face of said shovel portion, and a transverse cutting edge on the forward part of said shovel portion disposed entirely below the axis of said shank portion.

2. In a replaceable tooth for rotary earth cutting means, an elongated attachment shank of slightly tapering frustro-conical form, a stiffening rib starting at the smaller rear end of said shank and extending forwardly along and projecting from the lower side of said shank, an obliquely disposed transverse shovel portion extending forwardly and downwardly from the larger forward end of said shank to leave a material deflecting abutment exposed at the forward end of said shank and spreading laterally therefrom on both sides thereof, said stiffening rib also extending forwardly from the forward end of said shank beneath and merged with the back of said shovel portion, and a transverse cutting edge on the forward part of said shovel portion disposed entirely below the axis of said shank portion.

3. In a replaceable tooth for rotary earth cutting means, an elongated attachment shank of slightly tapering frustro-conical form, a stiffening rib starting at the smaller rear end of said shank and extending forwardly along and projecting from the lower side of said shank, an obliquely disposed transverse shovel portion extending forwardly and downwardly from the larger forward end of said shank spreading laterally therefrom on both sides thereof, said stiffening rib also extending forwardly from the forward end of said shank beneath and merged with the lower face of said shovel portion, a transverse cutting edge on the forward part of said shovel portion being disposed entirely below said shank portion, and a plurality of hard inserts secured in place by a fusion bond along said cutting edge.

4. In a replaceable tooth for rotary earth cutting means, an elongated tapering attachment shank, a stiffening rib extending along and projecting from the lower side of said shank, an obliquely disposed transverse shovel portion extending forwardly and downwardly from the larger forward end of said shank spreading laterally therefrom on both sides thereof, said stiffening rib extending to and being merged with the lower face of said shovel portion, and a transverse cutting edge on the forward part of said shovel portion disposed entirely below the axis of said shank portion.

HENRY C. HETTELSATER.
GEORGE L. GAVIN.

REFERENCES CITED

The following references are of record in the file of this patent:

UNITED STATES PATENTS

| Number | Name | Date |
|---|---|---|
| 1,803,875 | Stoody et al. | May 5, 1931 |
| 1,855,330 | Zublin | Apr. 26, 1932 |
| 1,902,513 | Meutsch | Mar. 21, 1933 |
| 1,908,161 | Meutsch | May 9, 1933 |
| 1,960,879 | Russell et al. | May 29, 1934 |

FOREIGN PATENTS

| Number | Country | Date |
|---|---|---|
| 705,133 | France | Mar. 3, 1931 |